United States Patent

[11] 3,537,428

| [72] | Inventor | James R. Montgomery |
| | | Maplewood, Missouri |
| [21] | Appl. No. | 714,200 |
| [22] | Filed | March 19, 1968 |
| [45] | Patented | Nov. 3, 1970 |
| [73] | Assignee | Mallinckrodt Chemical Works |
| | | St. Louis, Missouri |
| | | a corporation of Missouri |

[54] VENTILATED CAGE PARTICULARLY FOR PATHOGEN-INFECTED ANIMALS
11 Claims, 7 Drawing Figs.

[52] U.S. Cl. ................................................. 119/18, 119/15
[51] Int. Cl. ....................................................... A01k 01/00
[50] Field of Search ............................................ 119/15, 17, 18

[56] References Cited
UNITED STATES PATENTS

| 2,881,733 | 4/1959 | Young et al. ................ | 119/15 |
| 3,122,127 | 2/1964 | Schechmeister et al. ...... | 119/18 |
| 3,304,913 | 2/1967 | Nesher ......................... | 119/15 |
| 3,343,520 | 9/1967 | Schwarz ....................... | 119/15 |

Primary Examiner—Hugh R. Chamblee
Attorney—Koenig, Senniger, Powers and Leavitt

ABSTRACT: A cage for virus-infected laboratory animals having an access opening and a removable ventilating closure therefor, the closure including a filter for passage of air while blocking ingress or egress of viral pathogens, the filter being protected against damage from an animal in the cage or careless handling by a laboratory attendant. Provision is made for removably mounting a water bottle in sealed relation at the top of the cage, and for filtered connection of the interior of the cage to a low volume vacuum pump to reduce pressure in the cage somewhat below atmospheric pressure, so that any air leakage will be into rather than out of the cage.

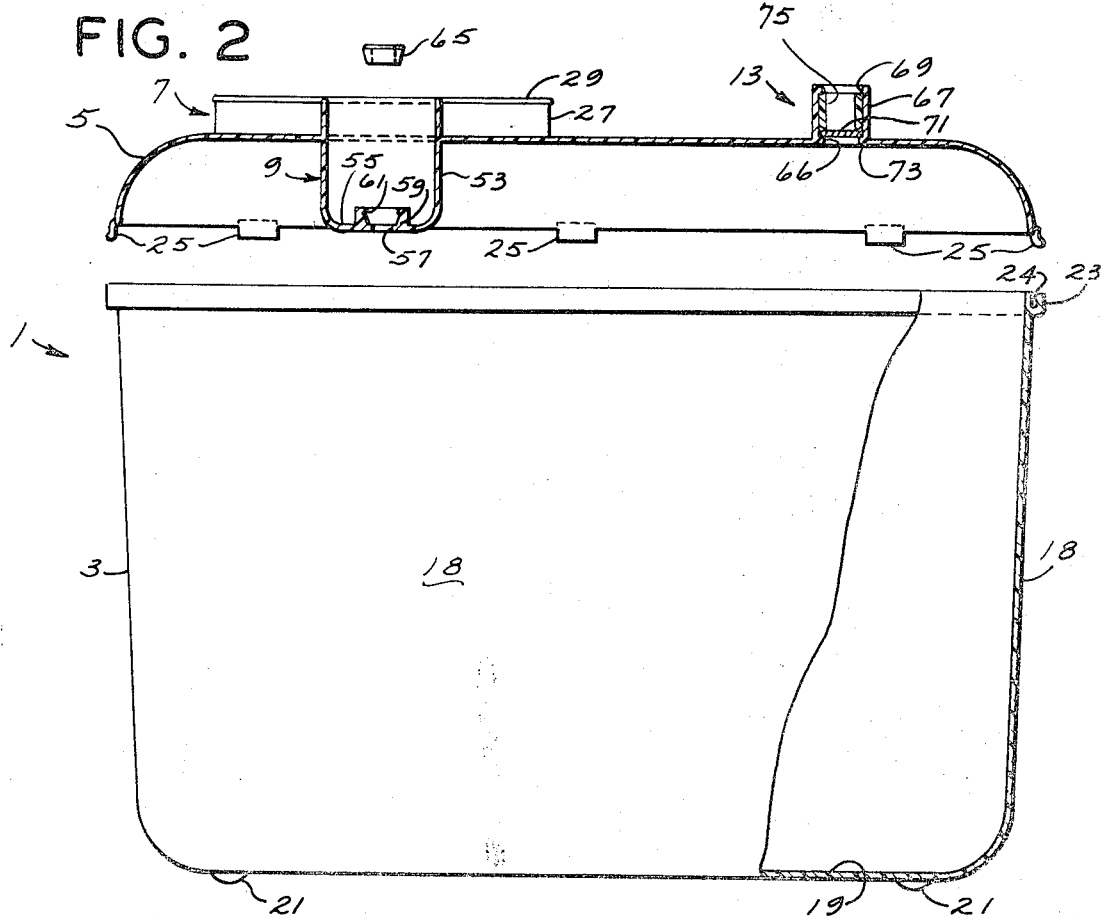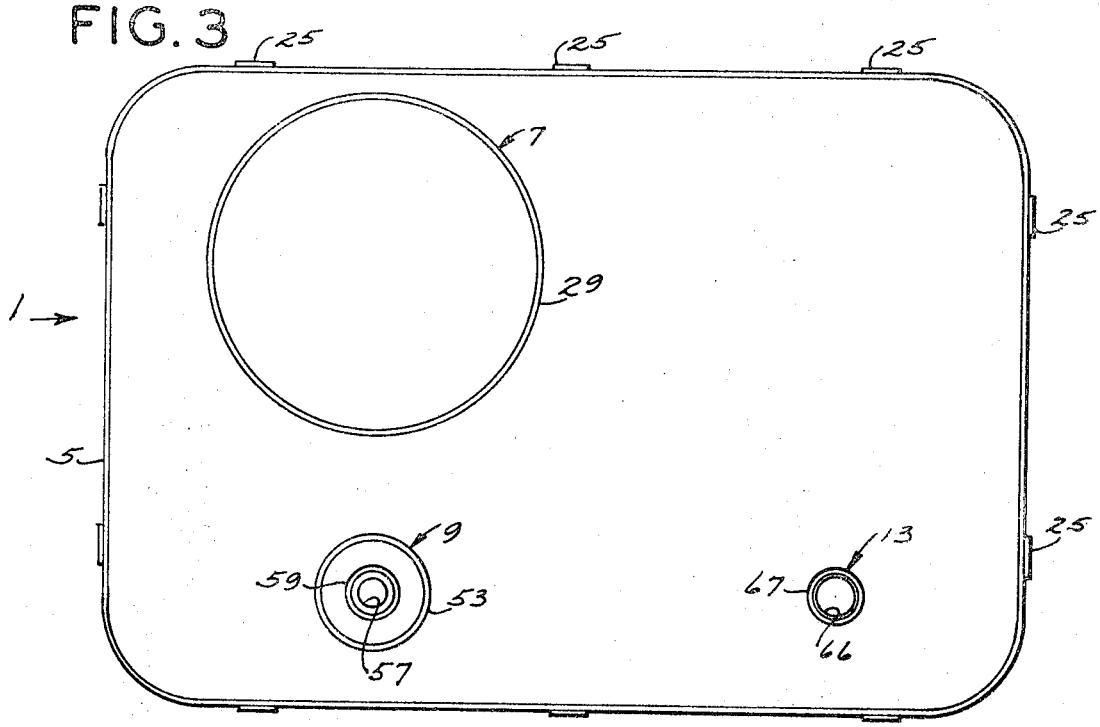

# 3,537,428

VENTILATED CAGE PARTICULARLY FOR PATHOGEN-INFECTED ANIMALS

BACKGROUND OF THE INVENTION

This invention relates to animal cages, and particularly to a ventilated cage for pathogen-infected laboratory animals.

Animal cages are widely used in research and the like where it is important to study the effects of various viral agents on test animals. Such cages are generally used with small rodents such as mice, rats, etc. When working with virus-infected animals, it is necessary to maintain the cage sealed against ingress and egress of virus organisms, as well as encaging the animal, while providing for ventilation so that the encaged animal may breathe. Heretofore, ventilating systems for this purpose have been bulky and inconvenient to use.

SUMMARY OF THE INVENTION

Among the several objects of this invention may be noted the provision of a cage, particularly for virus-infected animals, which is effectively sealed against egress or ingress of virus organisms, while providing adequate ventilation for the encaged animal; the provision of such a cage in which access to the interior of the cage is readily achieved for placing an animal in the cage or removing an animal therefrom, for example, and in which the cage may thereafter be resealed for maintaining the cage and its surroundings free of contaminants; the provision of such a cage which is adapted for the sealed entry of a water bottle for supplying the encaged animal with water while maintaining the cage sealed against egress or ingress of virus organisms; the provision of a cage as above described in which a vacuum may be drawn therein so that any air leakage is inward into the cage rather than outward from the cage; the provision of a cage of the class described in which the ventilating air is filtered and in which the filter media is protected against damage from both within and without the cage; and the provision of such a cage which is characterized by simplicity of construction, low cost and ease of use.

In general, a ventilated animal cage of this invention comprises an airtight enclosure of sufficient volume and dimension for the animal being encaged. The enclosure comprises a bottom portion with a floor for the animal, a top portion and an access opening in one of said portions. A removable ventilating closure is provided for the access opening, the closure having means thereon for effecting an airtight seal with said one portion around the access opening, a ventilating opening and a filter for the ventilating opening. Other objects and features will be in part apparent and in part pointed out hereinafter.

BRIEF DESCRIPTION OF THE DRAWINGS

FIG. 2 is a side elevation, partly in section, of the cage of FIG. 1 with its lid removed;

FIG. 3 is a plan view of the cage of FIG. 1, with the lid removed;

Corresponding reference characters indicate corresponding parts throughout the several views of the drawings.

DESCRIPTION OF THE PREFERRED EMBODIMENTS

Figure 1:
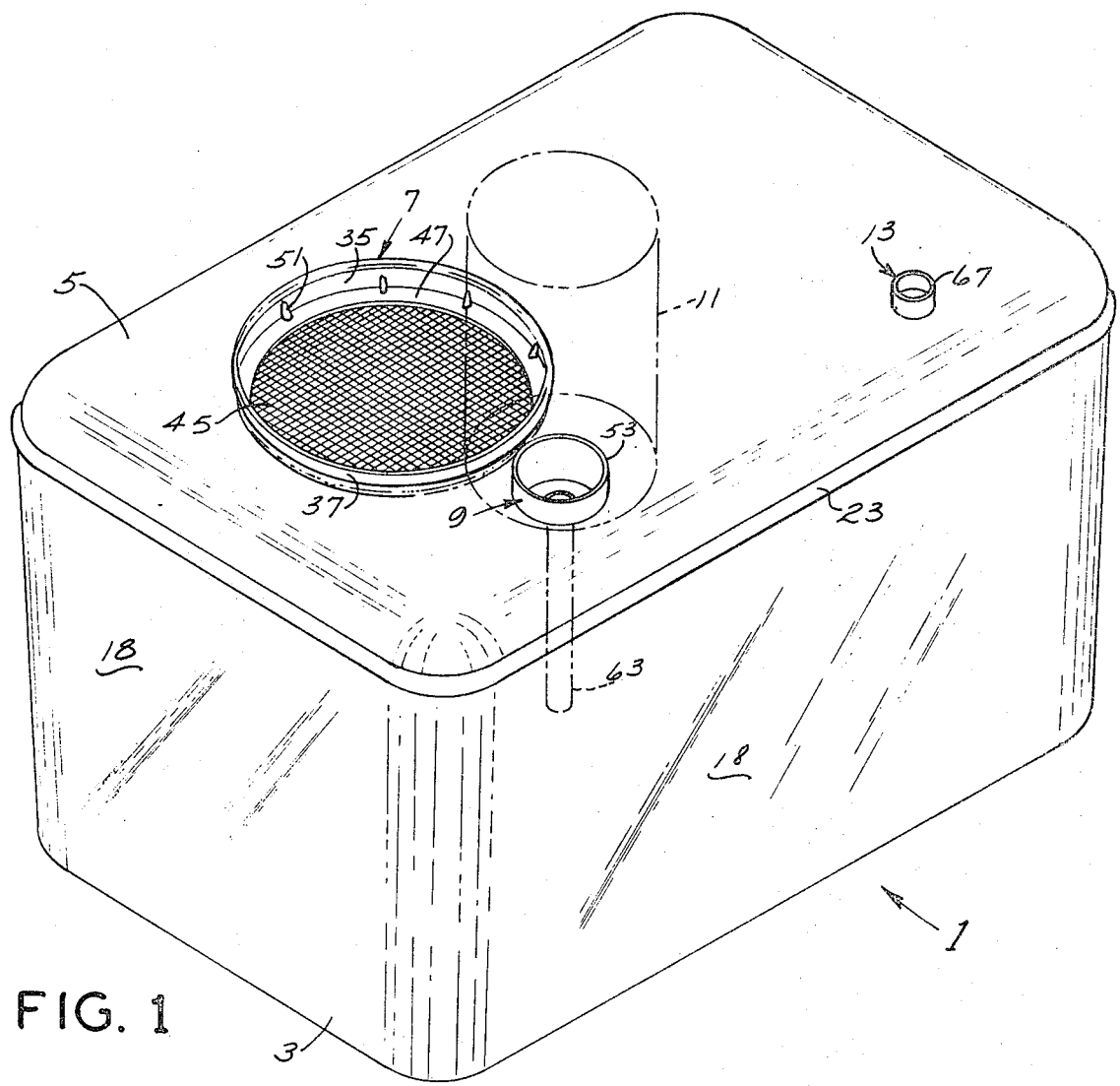
FIG. 1 is a perspective of a cage of this invention.

Referring to FIGS. 1—6 of the drawings, a ventilated animal cage of this invention is generally designated 1. In general, the cage 1 comprises a housing or enclosure, rectangular in plan, comprising a lower or bottom portion 3 and an upper or top portion 5. The upper portion 5 is adapted to be joined to the lower portion 3 for enclosing the latter. The upper portion is formed with an opening 7 for access to the interior of the cage and for ventilating the cage, a cup 9 for mounting a water bottle 11 at the top of the cage, and a vacuum port 13 for connection of a line for drawing a vacuum in the cage, as will appear. A removable ventilating closure 15 is provided for the access opening 7. This closure has a filter 17 for filtering the air entering or leaving the cage, as also will appear.

More particularly, the lower portion 3 of the cage enclosure is of box form having four vertical sides 18 and a horizontal bottom or floor 19, on the bottom of which generally near the corners thereof are four buttons or pads 21 for supporting the cage. At the top of the lower portion 3 is a peripheral flange 23 formed with an upwardly opening groove 24. This groove has a restricted neck. It receives receives a plurality of tongues 25 depending from the periphery of the upper portion or lid 5 of the enclosure. As shown in FIG. 3, three of such tongues are provided along each of the long sides of the lid and two of such tongues are provided along each of the short sides, although it should be understood that any number of tongues may be provided or a continuous tongue may extend along the entire length of each of the four sides. Each of the tongues 25 is of the same cross-sectional configuration as the groove 24 for a snap-fit, secure joinder of the lid 5 and bottom portion 3. The tongue and groove joint provides an airtight seal and prevents the animal within the cage from pushing the lid off and escaping. The lower portion 3 and lid 5 are preferably molded of a transparent plastic. If the cage is to be used only once and thereafter disposed of, it is preferred that the lid be bonded to the lower housing portion by a suitable mastic sealant, such as silicone rubber or rubber cement. Alternatively, a solvent may be utilized, when the parts are made of a suitable plastic, for bonding purposes. If the cage is to be reused, the lid is not bonded to the lower housing portion for removal of the lid and cleaning of the cage, the lid being snapped on and off.

Figure 4:
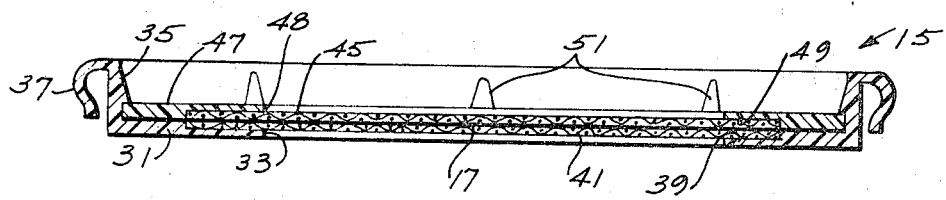
FIG. 4 is an enlarged section of the removable ventilating closure per se of the cage of FIG. 1.
Figure 5:
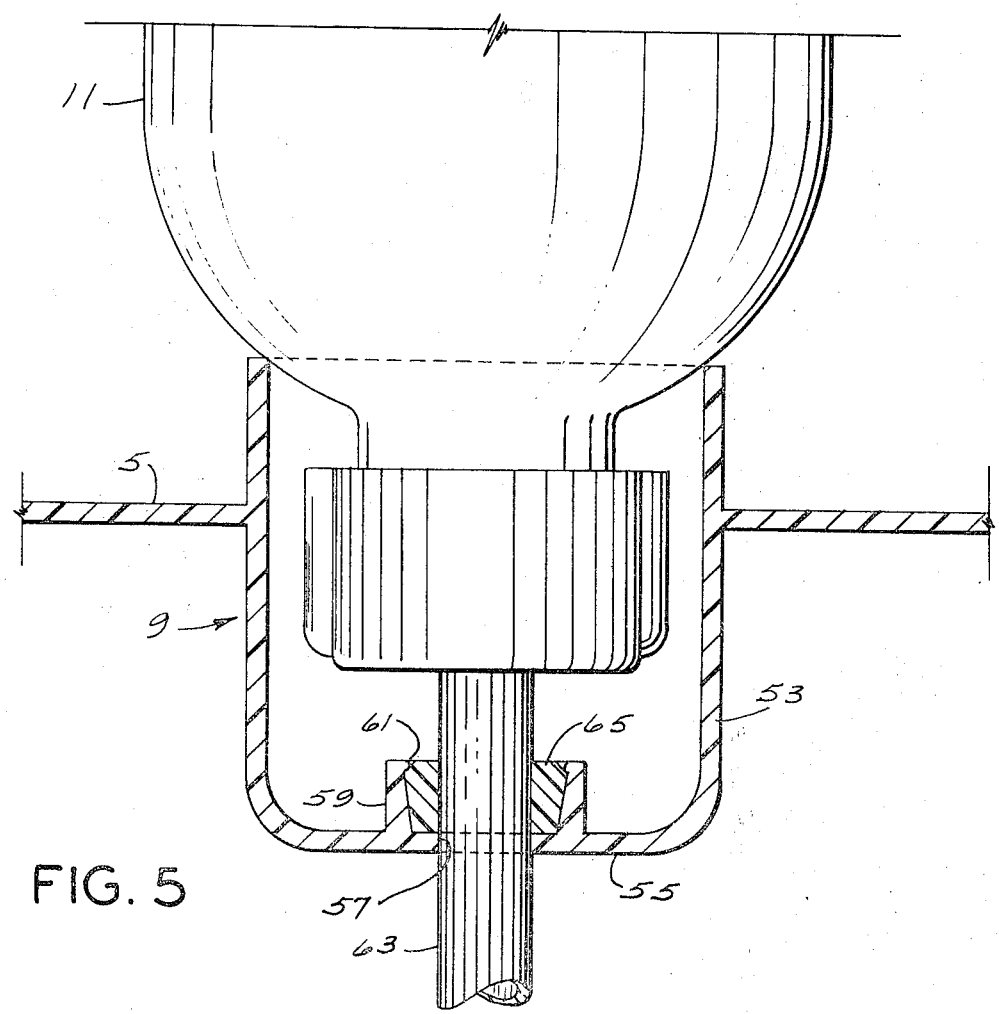
FIG. 5 is an enlarged section showing how a water bottle is mounted at the top of the cage.
Figure 6:
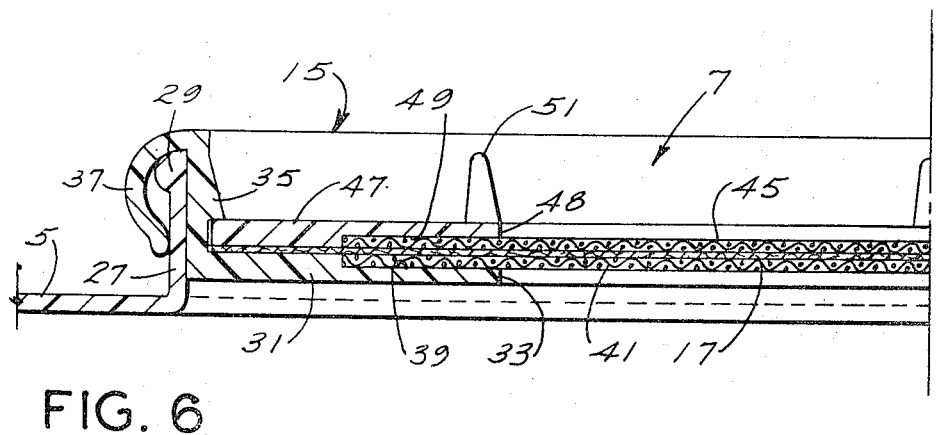
FIG. 6 is an enlarged fragment of FIG. 4.

The access opening 7 is of sufficient diameter for a laboratory assistant to reach into the cage for encaging or removing an animal. An annular lip 27 extends outwardly (upwardly) from the lid around the opening 7 and has a bead 29 at its upper end. The closure 15 is carried by this lip for closing the opening 7 to prevent the animal from escaping from the cage and to seal the cage against ingress or egress of virus organisms. As shown in FIGS. 4 and 6, the closure 15 comprises a molded plastic ring 31 having a relatively large center opening 33. At the outer edge of the ring is an upstanding cylindric wall 35 having a curved skirt 37 extending outwardly and downwardly from its upper margin. This skirt extends completely around the closure and is adapted to snap over the bead 29 on the lip 27 for securely holding the closure over the access opening 7. The upper surface of the ring 31 is stepped for providing a circumferential annular groove 39 surrounding opening 33 carrying a first or lower wire mesh screen 41, the diameter of which is substantially equal to the outer diameter of the groove. The filter 17 is a circular sheet of filter material of larger diameter than the screen 41. The said filter is carried on top of the screen 41 and on the upper step of the ring 31, the filter preferably having a diameter corresponding to the inside diameter of the upwardly extending cylindric wall 35. A second or upper wire mesh screen 45 of the same diameter as the first screen 41 is disposed on top of the filter 17 and a flat retainer ring 47 is provided for holding the screens and filter in place. The retainer ring has a center opening 48 having a diameter corresponding to that of opening 33, and a stepped formation in its lower surface providing an annular groove 49 of dimensions corresponding to groove 39 surrounding the center opening 48 in the retainer ring receiving the upper screen 45. The retainer ring snaps into place to hold the screens and the filter sheet sandwiched together by snapping in place underneath a plurality of lugs 51 spaced around the inside face of the cylindric wall 35. The marginal portion of the retainer ring 47 compresses the marginal portion of the filter 17 against the raised marginal step of the ring 31, providing an airtight seal at the edges of the screens and filter to insure that all air entering or leaving the cage passes through the filter 17.

The bottle-mounting cup 9 is recessed in the lid 5. It has a cylindric wall 53 and a bottom 55 having a central hole 57 therein. An annular boss 59 extends upwardly from the bottom 55 around the hole 57 forming a socket, the boss having an inwardly facing annular peripheral bead 61 at its upper edge. The water bottle 11 has a spout or delivery tube 63 extending from one end for delivery of the water from the bottle to the animal. This spout is fitted in the bore of a soft pliable plug 65 adapted for a snap fit in socket 59 so that, with the plug 65 on the spout 63, the bottle is firmly held in place in the cup 53 by snapping the plug 65 into the socket 59, the spout 63 extending downwardly through the hole 57 and the bottle engaging the rim of the cup (see FIG. 5). This arrangement provides an airtight seal for the water bottle while permitting the bottle to be removed for refilling by snapping the plug or stopper 65 out of the socket 59.

The port 13 in the lid 5 is formed by a hole 66 having a cylindrical nipple 67 therearound, the latter having an inwardly facing annular circumferential bead 69 at its upper end. A filter 71 is carried within the cylinder 67 on a shoulder 73 around the hole. The filter is held within the nipple by a resilient tubular retainer 75 having a bevelled top edge which snaps under the bead 69 of the nipple 67. The nipple is adapted for connection of a vacuum line for withdrawing air from the interior of the cage, to insure that any air leakage around the closure 15, filter 17 or bottle receptacle 53 will be into the cage rather than out of the cage. The vacuum pump need only draw one or two inches of water, for example, to pull a sufficient vacuum in the cage to insure this inward leakage.

Figure 7:
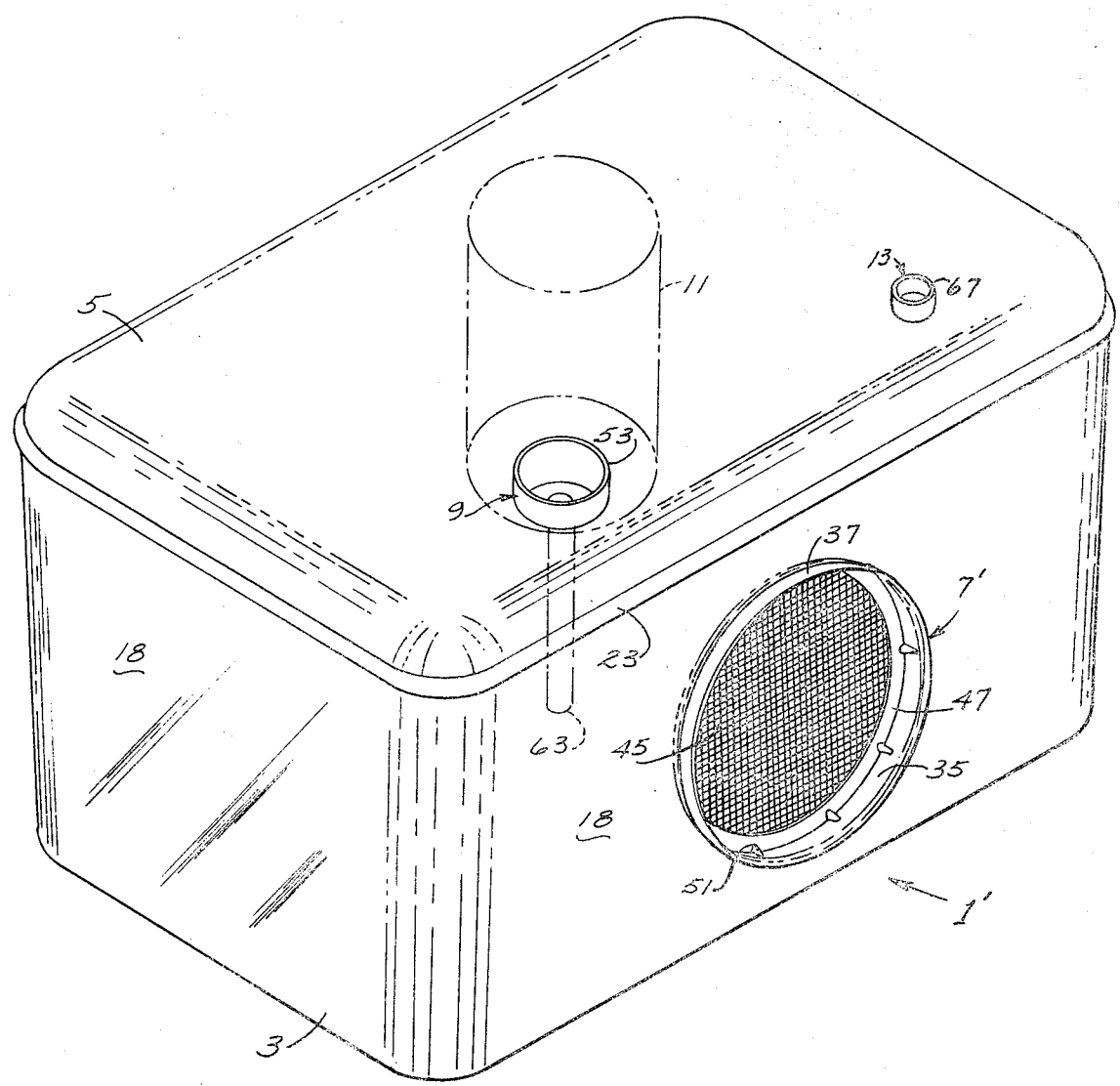
FIG. 7 is a perspective of an alternative embodiment of the cage.

In the alternative embodiment of the cage 1' illustrated in FIG. 7, the access opening, indicated by reference numeral 7', is formed in one of the sides 18 of the lower housing portion 3. The annular lip 27 (FIG. 6) extends outwardly from the side 18 around the opening 7' and the bead 29 circumscribes its outer end. The closure 15, including filter 17, screens 41 and 45 and retainer 47, snaps over the bead 29 on the lip 27 in the same manner as that described for the opening 7 of FIGS. 1-6. Although the opening 7' is shown in one of the longer sides of the lower cage portion, it should be understood that it may also be formed in one of the shorter sides. In all other respects, the cage 1' is identical to cage 1.

The cage parts may be formed in any conventional manner, such as by injection molding of any suitable air impermeable, preferably transparent, material, such as styrene, polypropylene, polyethylene or polycarbonate. It is preferred that the plug 65 and cylindric retainer 75 be formed of a soft plastic material, such as polyethylene, so as to fit tightly in their respective sockets and form airtight seals. Each of the filters 17 and 71 is preferably a sheet of chromar, a glass fiber sheet highly loaded with chromatographic sorbent, sold by the Mallinckrodt Chemical Works of St. Louis, Missouri. This material has excellent filtering properties for viral pathogens, although it should be understood that other suitable filter materials may also be utilized. The cage may be constructed in various sizes for encagement of different animals. For example, an 8 inch wide by 12 inch deep cage could be 5 inches high for mice and 8 inches high for rats and guinea pigs, these dimensions following the guidelines suggested by the U.S. Department of Health, Education and Welfare for the housing of laboratory animals.

To use the cage of this invention for encaging pathogen-infected animals, for example, the lid 5 and the lower housing portion 3 are placed in registry and the tongues 25 are snapped into the circumferential groove 24. Since the tongues and groove are configured in cross section for a tight snap fit, an airtight seal is obtained at the interface of the upper and lower housing portions. If the cage is to be reused with another animal, the lid is not bonded to the lower housing portion. However, if the cage is to be disposed of after a single use, either a mastic sealing material, such as silicone rubber or rubber cement, or a solvent for the plastic, such as acetone or chloroform, may be applied to bond the lid to the lower portion of the enclosure. When a solvent is used, the lid becomes substantially integral with the lower enclosure portion.

The animal to be encaged, together with whatever equipment or supplies may be needed in the cage, are inserted into the cage through the open access port 7 or 7'. This port is then closed by the closure 15 containing the screens and filter 17. To assemble the closure 15, the lower wire mesh screen 41 is placed in the groove 39 and the filter 17 is placed on top of the screen 41. This is followed by application of the upper screen 45 and the flat snap-on retainer ring 47. With the retainer ring 45 snapped into position beneath the lower edges of lugs 51, the marginal portion of the filter is sealed against air leakage around its periphery. With the closure skirt 37 snapped around the bead 29 on the lip 27 of the cage, all ventilating air passing into and out of the cage must pass through the filter 17. This prevents escape from or entrance into the cage of all airborne contaminants. The lower screen 41 prevents the encaged animal from eating away or clawing or scratching the filter 17, while the upper screen 45 prevents damage to the filter by careless handling by laboratory assistants, shipping, etc.

The water bottle 11 is filled with water and the soft plastic plug 65 is applied to the spout 63. The bottle is then inverted and the spout 63 is passed through the aperture 57 in the bottom of cup 9 in the lid 5. With the neck of the bottle received in the cup 9, the plug 65 is snapped into the socket 59 to seal the aperture 57 against leakage of air, and to hold the spout 63 in the cage at a suitable height above the floor 19. It will be understood that the bottle may be removed as necessary for refilling by unsnapping the plug 65 from its socket 59.

If desired, a slight vacuum may be drawn in the cage to insure that all leakage of air is inward rather than outward. This may be accomplished, after insertion of the filter 71 and retainer 75, by connection of a vacuum line to nipple 67, with the filter 71 serving to filter the effluent against escape of the virus. If this feature is not desired, a solid plug may be inserted in nipple 67 to seal the hole 66.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A ventilated animal cage comprising an airtight enclosure of sufficient volume and dimension for the animal being encaged, said enclosure comprising a bottom portion with a floor for the animal and a top portion, an access opening in one of said portions, and a removable closure for said access opening, said closure having means thereon for effecting an airtight seal with said one portion around said access opening, a ventilating opening in said closure, and a filter for said ventilating opening, an annular lip extending outwardly of said one portion around said access opening, said closure being removable interengaged with said lip, screens on each side of said filter for protecting said filter against damage, said closure comprising a ring having a snap fit with said lip for effecting said seal, and means for sealing the margin of said filter around said ventilating opening, said ring having an annular groove around the opening therein receiving the lower of the screens, the filter overlying the upper surface portion of the ring surrounding said groove, and a retainer ring having an annular groove in its lower face around the opening therein receiving the upper screen, said retainer ring having a snap fit with said closure ring and acting to compress the margin of the filter.

2. A cage as set forth in claim 1 wherein said access opening is in said top portion.

3. A cage as set forth in claim 1 wherein said access opening is in one of the sides of said bottom portion.

4. A ventilated animal cage comprising an airtight enclosure of sufficient volume and dimension for the animal being encaged, said enclosure comprising a bottom portion with a floor for the animal and a top portion, an access opening in one of said portions, and a removable closure for said access opening, said closure having means thereon for effecting an airtight seal with said one portion around said access opening, a ventilating opening in said closure, a filter for said ventilating opening, a cup in said top portion for receiving a water bottle, said cup being recessed in said top portion and having a hole in its bottom, and an annular boss extending upwardly from the bottom of the cup around said hole providing a socket adapted for receiving a plug fitted on the spout of said bottle.

5. A cage as set forth in claim 4 wherein said socket has an inwardly projecting peripheral bead at its upper end and said plug is adapted to snap into said socket under said bead.

6. A ventilated animal cage comprising an airtight enclosure of sufficient volume and dimension for the animal being encaged, said enclosure comprising a bottom portion with a floor for the animal and a top portion, an access opening in one of said portions, and a removable closure for said access opening, said closure having means thereon for effecting an airtight seal with said one portion around said access opening, a ventilating opening in said closure, a filter for said ventilating opening, said top portion having a port for drawing air from the housing, a filter for said port, said port being constituted by a hole in said top portion, a nipple extending outwardly from said top portion around said hole for attachment of a suction line, said nipple having an inwardly directed peripheral bead at its upper end, said filter for said port covering the hole at the inner end of the nipple, and a tubular retainer plugged in said nipple between said filter for said port and said bead for holding the filter for said port in place.

7. A ventilated animal cage comprising an airtight enclosure of sufficient volume and dimension for the animal being encaged, said enclosure comprising a bottom portion with a floor for the animal and a top portion, an access opening in one of said portions, and a removable closure for said access opening, said closure having means thereon for effecting an airtight seal with said one portion around said access opening, a ventilating opening in said closure, a filter for said ventilating opening, said top and bottom enclosure portions being separable, and means joining said portions together comprising a flange extending around the upper end of said lower portion having an upwardly opening circumferential groove with a restricted neck at its entrance, and a plurality of tongues depending from the periphery of said upper portion, said tongues being formed for a snap fit in said groove.

8. A cage as set forth in claim 7 further comprising means for bonding said tabs to the groove walls.

9. A ventilated animal cage comprising an airtight enclosure of sufficient volume and dimension for the animal being encaged, said enclosure having a ventilating opening and a filter for said opening, said enclosure comprising a bottom portion with a floor for the animal and a top portion having a cup for receiving a water bottle having a spout at one end, said cup having a hole in its bottom for passage of the spout, an annular boss extending upwardly from the bottom of the cup around said hold providing a socket, and a tubular plug adapted to be tightly received in said socket with the spout of the bottle in the bore of the plug.

10. A cage as set forth in claim 9 wherein said socket has an inwardly directed peripheral bead at its upper end, and said plug being adapted for snapping into the socket under the bead.

11. A cage as set forth in claim 10 wherein said cup is recessed in said top enclosure portion.